United States Patent
Kim et al.

(10) Patent No.: US 8,571,105 B2
(45) Date of Patent: Oct. 29, 2013

(54) ENHANCED MOTION ESTIMATION METHOD, VIDEO ENCODING METHOD AND APPARATUS USING THE SAME

(75) Inventors: Jin-young Kim, Seoul (KR); Hyo-jung Song, Seoul (KR); Jun-sung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1707 days.

(21) Appl. No.: 11/511,484

(22) Filed: Aug. 29, 2006

(65) Prior Publication Data

US 2007/0047653 A1 Mar. 1, 2007

(30) Foreign Application Priority Data

Aug. 29, 2005 (KR) .................... 10-2005-0079532

(51) Int. Cl.
*H04N 7/12* (2006.01)
*H04N 11/02* (2006.01)
*H04N 11/04* (2006.01)

(52) U.S. Cl.
USPC .............. 375/240.16; 375/240.1; 375/240.12

(58) Field of Classification Search
USPC ....................................... 375/240
See application file for complete search history.

(56) References Cited

U.S. PATENT DOCUMENTS

| | | | | |
|---|---|---|---|---|
| 5,473,379 A | * | 12/1995 | Horne | 375/240.16 |
| 6,418,166 B1 | * | 7/2002 | Wu et al. | 375/240.12 |
| 6,549,576 B1 | * | 4/2003 | Moriyoshi | 375/240.16 |
| 7,408,987 B1 | * | 8/2008 | Chevance et al. | 375/240.16 |
| 7,551,673 B1 | * | 6/2009 | Oh et al. | 375/240.16 |
| 2001/0002922 A1 | * | 6/2001 | Hayashi | 375/240.16 |
| 2005/0152452 A1 | * | 7/2005 | Suzuki | 375/240.16 |
| 2006/0209961 A1 | * | 9/2006 | Han et al. | 375/240.16 |

FOREIGN PATENT DOCUMENTS

| | | |
|---|---|---|
| EP | 0458249 A2 | 11/1991 |
| EP | 0537958 A2 * | 4/1993 |
| EP | 0537958 A2 | 4/1993 |
| EP | 0652678 A2 | 5/1995 |
| EP | 1 198 140 B1 | 9/2010 |
| JP | 08-018974 A | 1/1996 |
| JP | 11-205799 A | 7/1999 |
| JP | 2000-236552 A | 8/2000 |
| JP | 2001-169288 A | 6/2001 |
| JP | 2003-061112 A | 2/2003 |
| WO | 0014682 A2 | 3/2000 |
| WO | 00/70879 A1 | 11/2000 |

OTHER PUBLICATIONS

Communication dated Jun. 29, 2010 from the Japanese Patent Office in counterpart Japanese application No. 2006-226055.

(Continued)

*Primary Examiner* — Christopher S Kelley
*Assistant Examiner* — Hee-Yong Kim
(74) *Attorney, Agent, or Firm* — Sughrue Mion, PLLC

(57) ABSTRACT

A motion estimation method for enhancing a video compression speed, and a video encoder using the same are provided. The motion estimation method includes determining a global motion type of a previous frame from motion vectors of the previous frame, setting a search area for a specified motion block included in a current frame based on the global motion type, and searching for a motion vector within the set search area.

26 Claims, 13 Drawing Sheets

(56) References Cited

OTHER PUBLICATIONS

Fan J. et. al.: "Adaptive Motion-Compensated Video Coding Scheme Towards Content-Based Bit Rate Allocation", Journal of Electronic Imaging, SPIE / IS & T, vol. 9, No. 4, Oct. 1, 2000, pp. 521-533.
Communication dated Dec. 14, 2010, issued in counterpart European Application No. 06118687.0.

Communication dated Jan. 9, 2013 issued by the European Patent Office in counterpart European Patent Application No. 06 118 687.0.
Hwang-Seok Oh et al; "A New Block-Matching Algorithm Based on an Adaptive Search Area Adjustment Using Spatio-Temporal Correlation"; IEEE Transactions on Consumer Electronics, vol. 45, No. 3, XP11083796A, Aug. 1, 1999, pp. 745-752.

\* cited by examiner

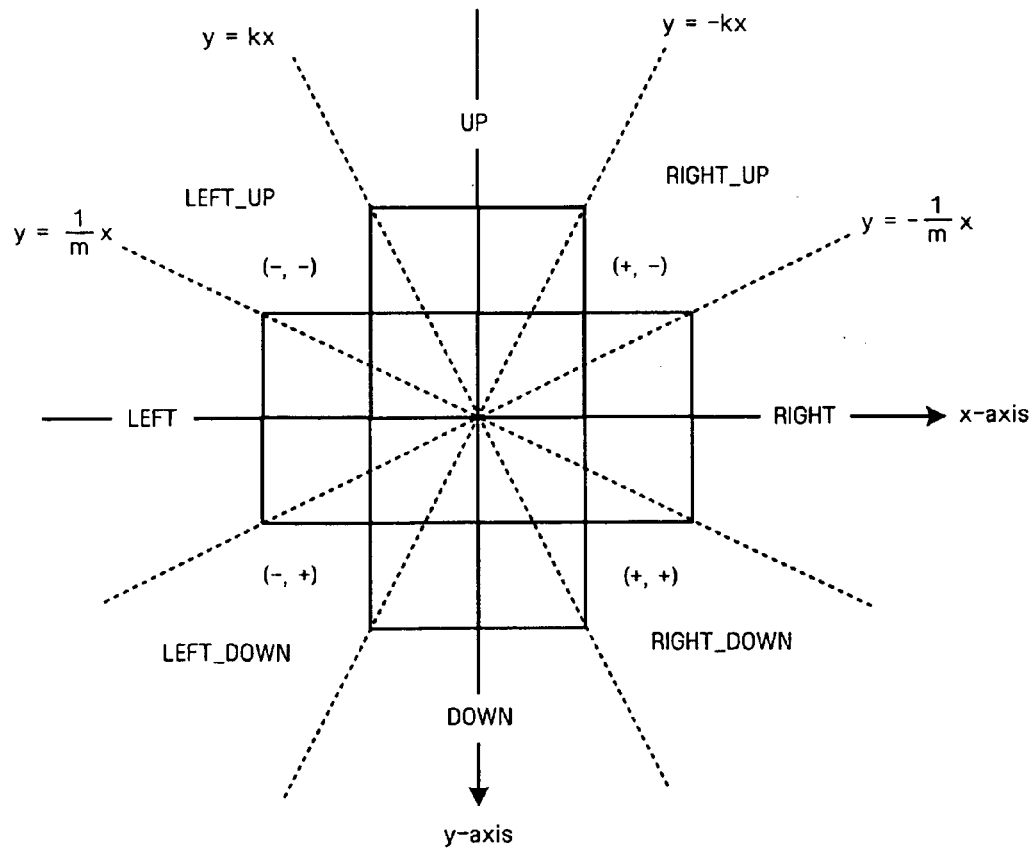

| gm_type | value |
|---|---|
| NO_GLOBAL_MOTION | 0 |
| PAN_RIGHT | 1 |
| PAN_LEFT | 2 |
| PAN_UP | 3 |
| PAN_DOWN | 4 |
| TILT_RIGHT_UP | 5 |
| TILT_RIGHT_DOWN | 6 |
| TILT_LEFT_UP | 7 |
| TILT_LEFT_DOWN | 8 |
| ZOOM_IN | 11 |
| ZOOM_OUT | 12 |
| ROTATE_CW | 13 |
| ROTATE_CCW | 14 |

FIG. 9

```
If (three or more of quarter1, quarter2, quarter3, and quarter4 are in the same direction).
    the corresponding direction is determined as gm_type.
    else if (quarter1 == LEFT_UP && quarter2 == RIGHT_UP && quarter3== LEFT_DOWN && quarter4 == RIGHT_DOWN)
        gm_type= ZOOM_IN;
    else if (quarter1 == RIGHT_DOWN && quarter2 == LEFT_DOWN && quarter3 == RIGHT_UP && quarter4 == LEFT_UP)
        gm_type = ZOOM_OUT;
    else if (quarter1 == RIGHT_UP && quarter2 == RIGHT_DOWN && quarter3 == LEFT_UP && quarter4 == LEFT_DOWN)
        gm_type = ROTATE_CW;
    else if (quarter1 == LEFT_DOWN && quarter2 == LEFT_UP && quarter3 == RIGHT_DOWN && quarter4 == RIGHT_UP)
        gm_type = ROTATE_CCW;
    else
        gm_type = NO_GLOBAL_MOTION;
```

FIG. 13
ZOOM_IN
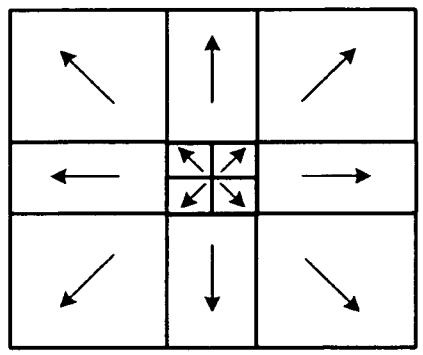
ZOOM_OUT
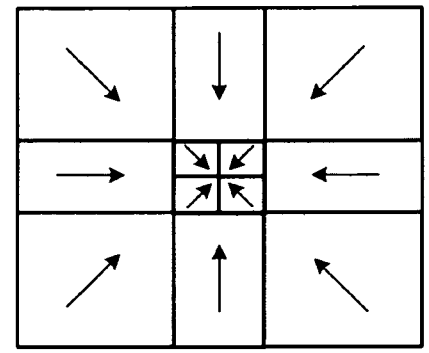
ROTATE_CW
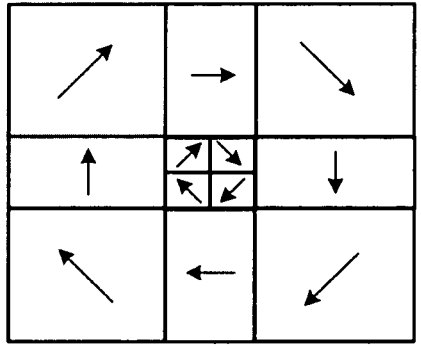
ROTATE_CCW
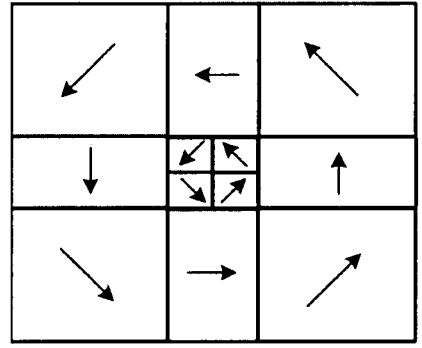

US 8,571,105 B2

ENHANCED MOTION ESTIMATION METHOD, VIDEO ENCODING METHOD AND APPARATUS USING THE SAME

BACKGROUND OF THE INVENTION

This application claims priority from Korean Patent Application No. 10-2005-0079532 filed on Aug. 29, 2005, in the Korean Intellectual Property Office, the disclosure of which is incorporated herein by reference in its entirety.

FIELD OF THE INVENTION

Methods and apparatuses consistent with the present invention relate to video compression, and more particularly, to enhancing video compression speed and a video encoder using the same.

DESCRIPTION OF THE RELATED ART

With the development of information and communication technologies including the Internet, multimedia communications are increasing in addition to text and voice communications. The existing text-centered communication systems are insufficient to satisfy consumers' diverse desires and, thus, multimedia services that can accommodate diverse forms of information such as text, image, music, and others, are increasing. Since multimedia data is large, mass storage media and wide bandwidths are required for storing and transmitting it. Accordingly, compression coding techniques are required to transmit the multimedia data.

The basic principle of data compression is to remove redundancy. Data can be compressed by removing spatial redundancy such as the repetition of a color or object in images, temporal redundancy such as little change of adjacent frames in moving images or the repetition of sounds, and visual/perceptual redundancy, which considers the human insensitivity to high frequencies. In a general video coding method, the temporal redundancy is removed by temporal filtering based on motion estimation and motion compensation, and the spatial redundancy is removed by a spatial transform.

Most current algorithms for motion estimation are based on local motion. However, global motion may occur due to the movement of a camera or the movement of an object that fully occupies a frame. Global motion means that respective pixels that constitute one frame move according to a certain rule, for example, such as a parallel movement or rotation of a whole scene, zoom in/out of the scene, and others.

FIG. 1 is a view explaining a related art motion estimation method. According to the related art motion estimation method, a motion vector is obtained when an error or the sum of absolute difference (SAD) is minimized. In this case, the movement range of the block 13 is not the whole reference frame 10, but is limited to a search area 14 a specified number of pixels size around a point 11 (the center of the block 13). This is because the motion vector is likely to be in adjacent to the original point 11, and it is inefficient to search the whole frame.

As shown in FIG. 1, while the motion block 13 moves in the search area 14, an error is calculated, and a motion vector is searched for that minimizes this error. In the coordinate system, the x-coordinate increases rightward and the y-coordinate increases downward. If the error is a minimum when the motion block 13 moves from a point 11 to a point 12, the motion vector is (−3, −2).

In the related art motion estimation method, i.e., the full-search algorithm, which searches for the motion vector by moving the motion block to all pixel positions within the specified search area, a large amount of calculations are required.

In fact, most processes performed in a video encoder correspond to motion estimation and motion compensation. In particular, in the case of using the hierarchical variable size block matching (HVSBM) algorithm, such as H.264 or the quarter-pixel method for finding a motion vector in the unit if a ¼ pixel, the amount of calculations abruptly increases.

Accordingly, a method is needed for reducing the amount of calculation in a video encoder by preferentially searching for a motion vector in an area having a high possibility of containing the best motion vector among given search areas.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a video encoding method and a video encoder which may reduce an amount of calculation by reducing a search range with the accuracy of a full search maintained when motion estimation is performed using global motion information.

The present invention also provides a standard for judging the global motion.

According to an aspect of the present invention, there is provided a motion estimation method, according to an exemplary embodiment of the present invention, which comprises determining a global motion type of a previous frame from motion vectors of the previous frame; setting a search area for a specified motion block included in a current frame based on the global motion type; and searching for a motion vector within the set search area.

According to another aspect of the present invention, there is provided a video encoding method including obtaining a motion vector of a current frame with reference to a reference frame, performing motion compensation of the reference frame using the motion vector obtained through the motion estimation and generating a predicted frame, and encoding a difference between the current frame and the predicted frame, the obtaining the motion vector comprising determining a global motion type of a previous frame from motion vectors of the previous frame; setting a search area for a specified motion block included in a current frame based on the global motion type; and searching for a motion vector within the set search area.

According to still another aspect of the present invention, there is provided a video encoder including a motion estimation unit for obtaining a motion vector of a current frame with reference to a reference frame, a motion compensation unit for motion-compensating the reference frame using the motion vector obtained through the motion estimation and generating a predicted frame, and a means for encoding a difference between the current frame and the predicted frame, the motion estimation unit comprising a global motion judgment unit for judging a global motion type of a previous frame from motion vectors of the previous frame; a search-area-setting unit for setting a search area for a specified motion block included in the current frame based on the global motion type; and a motion vector searching unit for searching for a motion vector within the set search area.

BRIEF DESCRIPTION OF THE DRAWINGS

The above and other aspects of the present invention will be more apparent from the following detailed description of exemplary embodiments taken in conjunction with the accompanying drawings, in which:

FIG. 3 is a view illustrating direction classes and values of the direction classes;

FIG. 4 is a view illustrating an example of classifying the direction class;

FIG. 9 is a view illustrating an example of an algorithm for determining global motion type;

FIG. 13 a view illustrating a representative vector for each section with respect to four types having different representative directions for respective quadrants of global motion types;

DETAILED DESCRIPTION OF THE EXEMPLARY EMBODIMENTS

Figure 1:
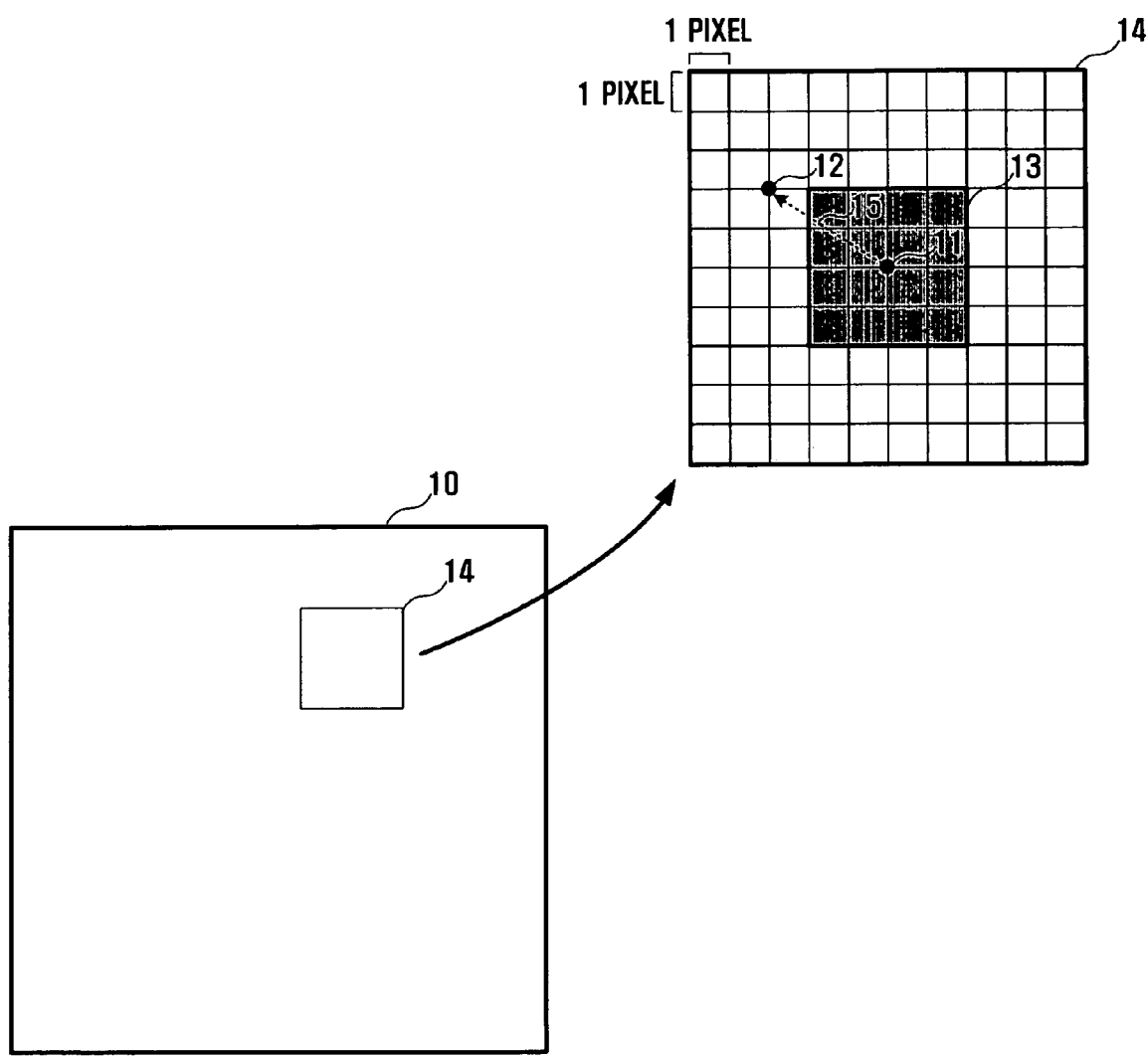
FIG. 1 is a view explaining a related art motion estimation method.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the invention, and the present invention is only defined within the scope of the appended claims. In the whole description of the present invention, the same drawing reference numerals are used for the same elements across various figures.

According to the present invention, an area to be preferentially searched among search areas is determined by applying global motion information to a full-search method; the determined area is first searched, and no further search is performed if an error is smaller than a reference value.

Figure 2:
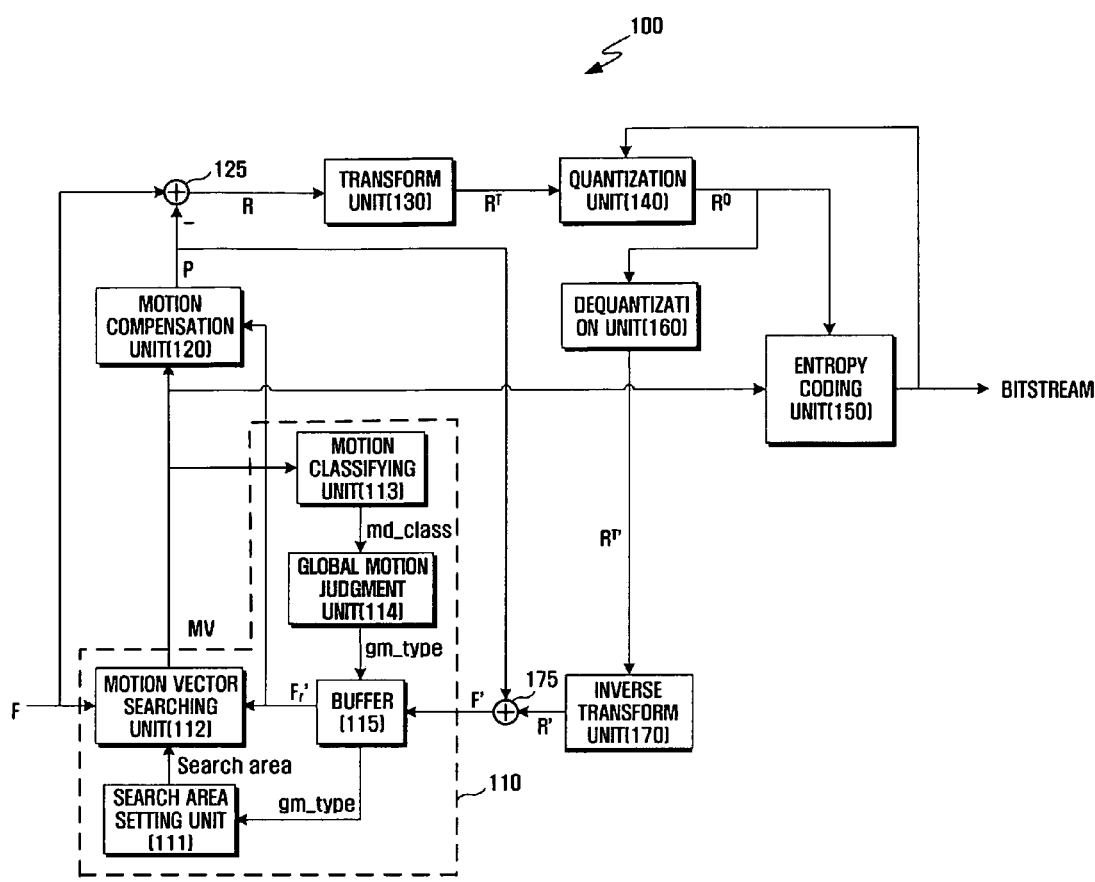
FIG. 2 is a view illustrating the construction of a video encoder according to an exemplary embodiment of the present invention.

FIG. 2 is a block diagram illustrating the construction of a video encoder 100 according to one exemplary embodiment of the present invention. The video encoder 100 includes a motion estimation unit 110, a motion compensation unit 120, a subtractor 125, a transform unit 130, a quantization unit 140, an entropy coding unit 150, an inverse-quantization unit 160, an inverse transform unit 170, and an adder 175.

The motion estimation unit 110 is the component to which the feature of the present invention is applied, and includes a motion-classifying unit 113 for determining which one among a specified number of direction classes (md_class) the calculated motion vector belongs to, a global motion judgment unit 114 for judging a global motion type (gm_type) according to the determined direction class, a buffer 115 for storing a restored frame F' and the global motion type, a search-area-setting unit 111 for setting a search area according to the global motion type, and a motion vector searching unit 112 for searching for a motion vector within the set search area.

The motion-classifying unit 113 determines which one among the specified number of direction classes the motion vector MV obtained by the motion vector searching unit 112 belongs to. In the exemplary embodiment of the present invention, the direction classes are classified into nine kinds of direction classes, as shown in FIG. 3. Of course, the direction classes may be classified into any number or types by those skilled in the art.

In FIG. 3, a class NO_MOVE indicates the case where the motion vector is "0", a class RIGHT indicates the case where the motion vector is rightward, and a class LEFT indicates the case where the motion vector is leftward. Also, a class UP indicates the case where the motion vector is upward, and a class DOWN indicates the case where the motion vector is downward. Classes RIGHT_UP, RIGHT_DOWN, LEFT_UP, and LEFT_DOWN indicate the cases where the motion vector is right upward, right downward, left upward, and left downward, respectively. The classes are respectively allocated the values 0 through 8 to classify them.

Since there may be a motion vector which does not exactly coincide with the above directions (e.g., a motion vector that is right upward at an angle of 30 degrees), it is necessary to provide a general classifying method.

FIG. 4 is a view explaining one example of classifying direction classes. Supposing that an abscissas axis is an x-axis, and an ordinate axis is a y-axis, the whole area is divided into eight areas by four straight lines: y=kx, y=x/m, y=−kx, and y=−x/m. Here, k and m are positive real numbers, and may take any value, and they may be the same or different from each other. In the exemplary embodiment of the present invention, k and m are 2.

Each of the eight divided areas correspond to one direction class. For example, the class UP, indicative of the motion vector facing upward, corresponds to an upper area among areas divided by the lines defined by y=kx and y=−kx.

Actually, if there is a motion vector of which an x-axis component is X_c and a y-axis component is Y_c, the direction class of the motion vector is expressed by Table 1 below.

TABLE 1

Direction Classes of Motion Vector

| md-class | Symbol of X_c | Symbol of Y_c | R = \|Y_c/X_c\| |
|---|---|---|---|
| 0 | 0 | 0 | . |
| 1 | (+1) | . | r < ½ |
| 2 | (−1) | . | r < ½ |
| 3 | . | (−) | r > 2 |
| 4 | . | (+) | r > 2 |
| 5 | (+) | (−) | ½ < r < 2 |
| 6 | (+) | (+) | ½ < r < 2 |
| 7 | (−) | (−) | ½ < r < 2 |
| 8 | (−) | (+) | ½ < r < 2 |

Figures 5, 6:
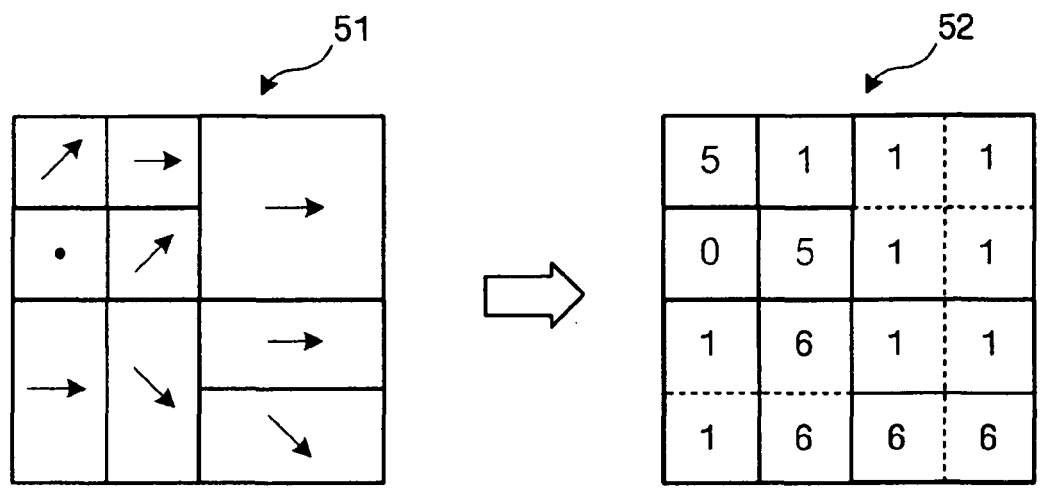
FIG. 5 is a view illustrating an example of transforming motion vectors into direction class values.
FIG. 6 is a view illustrating classes and values of the global motion type.

The motion-classifying unit 113 transforms plural motion vectors 51 in the current frame into a plurality of direction classes to output the values to the global motion judgment unit 114, as shown in an example of FIG. 5.

The global motion judgment unit 114 judges a global motion type of the current frame according to the direction class output from the motion-classifying unit 13. In one exemplary embodiment of the present invention, there are 13 global motion types in total including eight translational motion types, two rotational motion types, a zoom-in motion type, and a zoom-out motion type, as shown in FIG. 6.

Specifically, a type NO_GLOBAL_MOTION indicates a frame having no global motion. Types PAN_RIGHT, PAN_LEFT, PAN_UP, and PAN_DOWN indicate that the whole frame moves rightward, leftward, upward, and downward, respectively. Types TILT_RIGHT_UP, TILT_RIGHT_DOWN, TILT_LEFT_UP, and TILT_LEFT_DOWN indicate that the image-capturing device moved upward right, downward right, upward left, and downward left, respectively. Also, the types ZOOM_IN and ZOOM_OUT respectively indicate that the image-capturing device magnified and withdrew. Types ROTATE_CW and ROTATE_CCW respectively indicate that the image capturing device rotated in a clockwise direction and counterclockwise direction. The global motion type is allocated with values of 0 through 14 to classify the respective types. The types 1 through 8 are global motion types in which the image capturing device moves in one direction, and the types 11 through 14 are global motion types in which respective quadrants show different motions. Other global motion types may be added, and the proposed types may be modified or deleted.

Figure 7:
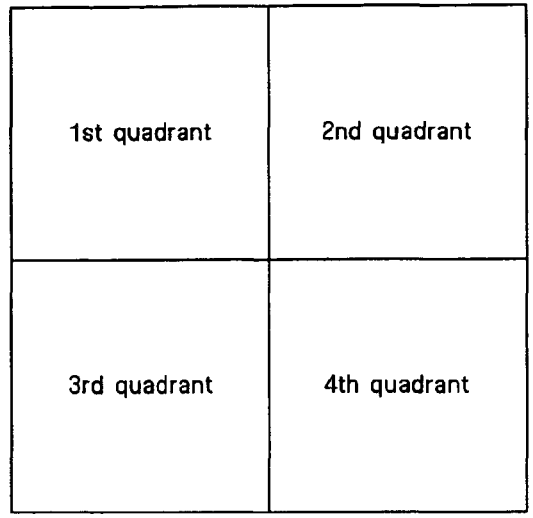
FIG. 7 is a view illustrating four quadrants obtained by dividing a frame into four sections.

The global motion judgment unit 114 quadrisects the current frame, as shown in FIG. 7, to form first through fourth quadrants, in order to determine the global motion type of the current frame. The global-motion-judgment unit 114 determines a representative direction for each quadrant. The representative direction means the direction indicated by the direction class as having the highest frequency among the values of the direction class.

If any quadrant shows the motion direction indicated by reference numeral 51 in FIG. 5, the value of the direction class for each block is shown by reference numeral 52. In this case, the direction class having the highest frequency can be obtained by restoring each block to a 4×4 block, which is the basic unit of the motion block. Since the value of the direction class having the highest frequency is 1 in FIG. 5, the corresponding quadrant is determined to have a right representative direction. This is only an exemplary embodiment, and it is possible to divide and analyze the frame by other methods according to convenience or purpose. Also, in addition to the 4×4 block, other block shapes may be established as a standard.

One frame has four representative directions in total, and the global motion judgment unit 114 judges the global motion type to which the current frame belongs based on four representative directions.

Figure 8:
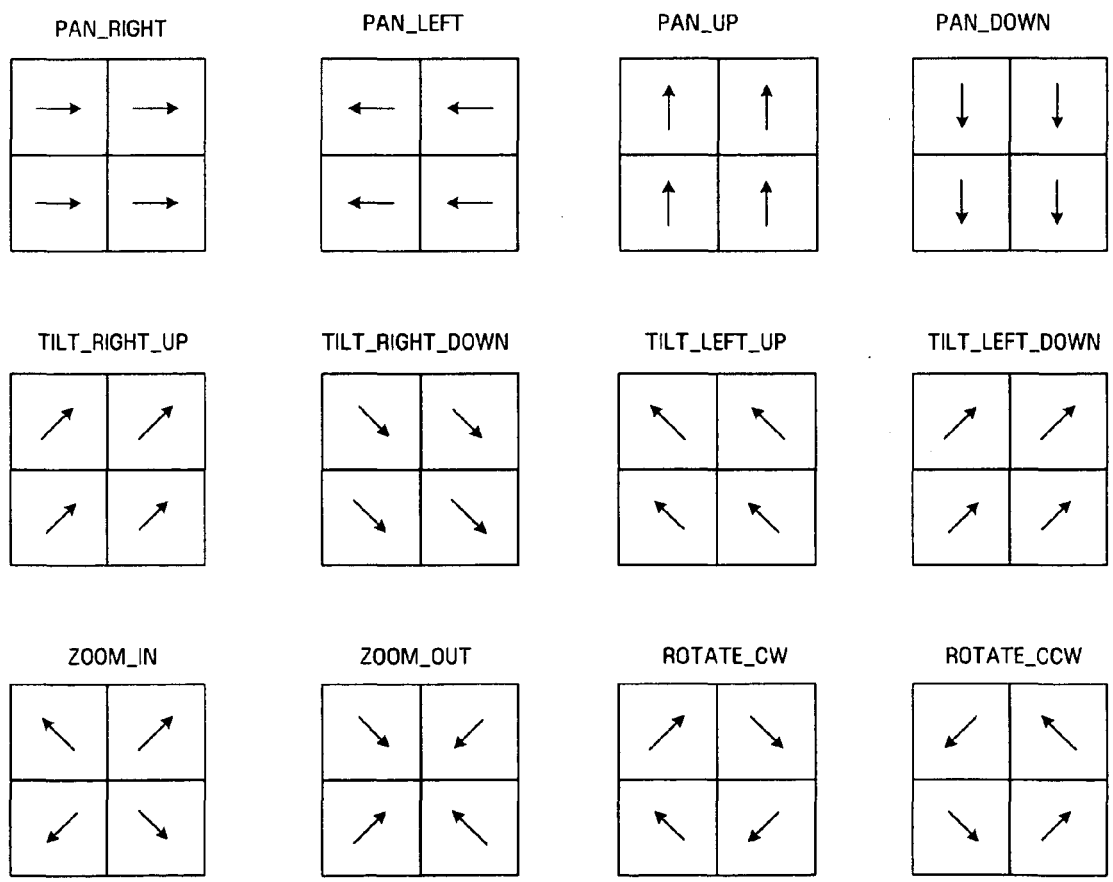
FIG. 8 is a view illustrating a representative direction for each quadrant according to 12 the global motion type.

Among 13 global motion types, 12 types are shown in FIG. 8; NO_GLOBAL_MOTION has been omitted. The arrow directions shown in FIG. 8 indicate the representative directions. It will be understood that the four quadrants move in the same direction in 8 types: PAN_RIGHT to TILT_LEFT_DOWN motions, but respective quadrants of other four types move in different directions.

The algorithm for judging the global motion type in the global motion judgment unit 114 based on the representative direction is expressed in FIG. 9. In FIG. 9, quadrants 1 through 4 are parameters indicative of the representative directions of the first through fourth quadrants. In the case where all quadrants move in the same direction, the direction is recognized as global motion. (In a set of parameters determining the motion direction and a set of parameters of global motion types in the motion block, 0 through 8 are defined as values having the same direction.) In this case, the reference may be adjusted, if necessary, for example, if at least three among four quadrants are in the same direction, global motion is recognized by a flexible algorithm. In the case where the type does not correspond to one of the 12 global motion types of FIG. 8, the algorithm determines that this is not global motion, and the global motion type is set to NO_GLOBAL_MOTION.

The global motion type judged for the current frame by the global motion judgment unit 114 is stored in the buffer 115, and is used when the motion vector is searched for in the next frame.

Then, if the next frame F is input to the motion vector searching unit 112, the motion vector searching unit 112 receives a search area from the search-area-setting unit 111.

The search-area-setting unit 111 sets the search area of the current motion block based on the global motion type stored in the buffer 115. In this case, if the global motion type is less than 8, the whole frame moves in the same direction. Accordingly, the same motion direction is applied to all the motion blocks to designate a preferential search area. If the global motion type is greater than 10, the motion direction is varied depending upon the position of the motion block. In this case, in view of the position of the current motion block in the frame, the area corresponding to the position of the current motion block is searched, and then the motion direction is searched for in the area. A preferential search area is designated in accordance with the motion direction. If the search area is set for the motion block, the motion vector searching unit 112 is provided with the set search area.

In general, the direction of the moving object of a video sequence and the direction of the motion vector may be identical or opposite to each other, in accordance with whether the reference frame exists prior to the current frame or after the current frame. If the frame existing after the current frame is set as a reference frame, the motion vector and the actual motion of the object may be substantially similar to each other. However, if the frame existing prior to the current frame is set as a reference frame, the motion vector and the actual motion of the object may be opposite to each other. The direction of all vectors indicated in the present invention sets the motion vector as a reference, regardless of actual motion. Actually, the motion direction of the object and the direction of the global motion type defined by the present invention may be opposite to each other. No problem is created if the motion search in one frame is carried out based on the same reference frame. However, if any macroblock in one frame sets a previous frame as a reference frame and the other macroblock sets a next frame as a reference frame, one of two macroblocks will be considered to have a representative direction opposite to the representative direction defined by the global motion type of the present invention.

The search-area-setting unit 111 selects a rectangular search area, as in the related art, and its width and length are expressed in units of pixels. A default value may be used as the search area, or a value inputted by a user may be used as the search area.

The search-area-setting unit 111 divides the search area into a preferential area having a high priority and other areas having low priority with reference to the global motion type of the previous frame stored in the buffer 115. This is because the global motion type of the current frame is likely to be identical to the global motion type of the previous frame.

Figure 10:
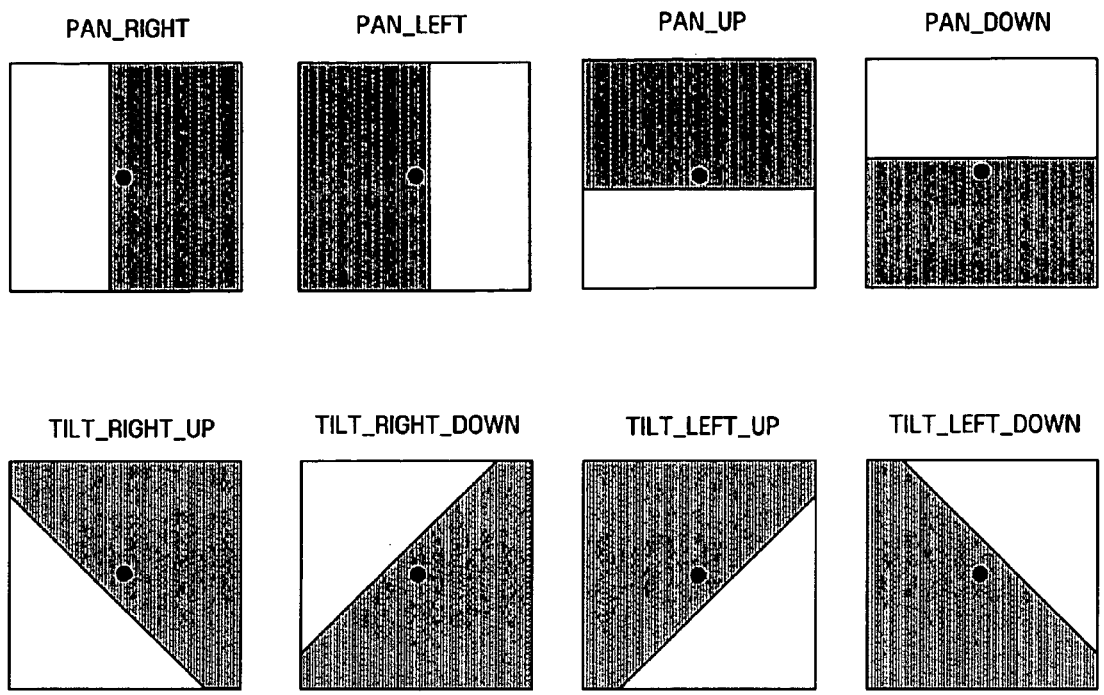
FIG. 10 is a view illustrating a method of dividing a search area into a preferential area and other areas with respect to eight types of global motion.

FIG. 10 shows a method of dividing search areas into the preferential areas and other areas with regard to 8 unidirectional types among 12 types shown in FIG. 8. Since all images within the frame may be considered to move in the same direction in the 8 types, the search areas in the frame has the same global motion type, regardless of the position of the search areas. In FIG. 10, the square indicates the search area, and the shaded part indicates the preferential area.

More specifically, in the case where the global motion type is PAN_RIGHT, the global motion is rightward. The point at which the error is minimized is likely found in the right area of a motion search block. Accordingly, the right area of the search origin is designated as an area having priority, i.e., a preferential area. Also, in the case where the global motion type is TILT_RIGHT_UP, since the global motion is right upward, the upper right area of the search area is designated as a preferential area. Preferential areas of the remaining global motion types are also designated in a similar manner.

As shown in FIG. 10, the preferential area is about ½ of the search area. In this case, it is preferable that the preferential area contains at least one search origin. The preferential area may be designated so that it somewhat exceeds ½ of the search area, as shown by dotted lines in FIG. 10. This is because the motion vector is likely to be around the search origin.

Figure 11:
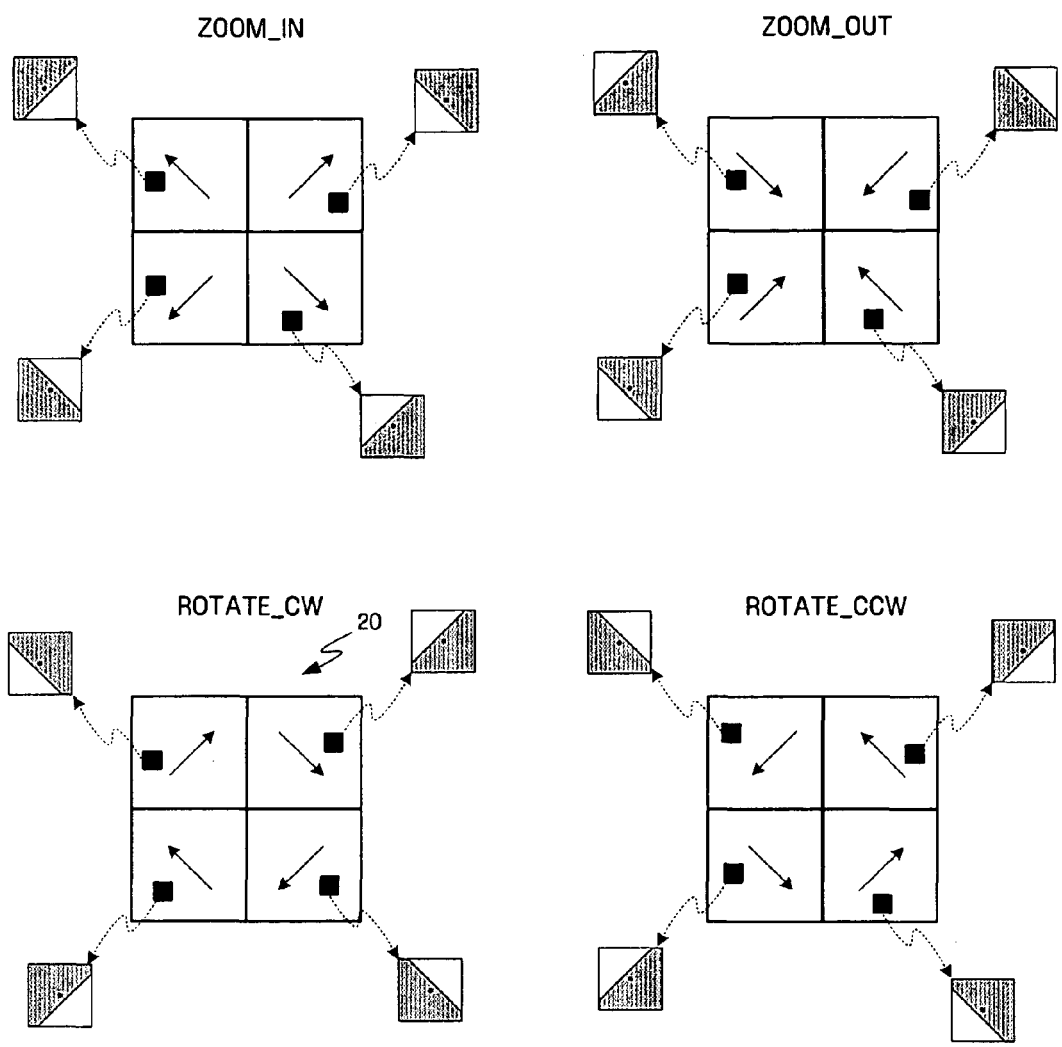
FIG. 11 is a view illustrating four types having different representative directions for respective quadrants of global motion types according to an exemplary embodiment of the present invention.

As shown in FIG. 11, since the frames having the types ZOOM_IN, ZOOM_OUT, ROTATE_CW, or ROTATE_CCW among the global motion types have different representative directions for each quadrant, it is necessary to find the quadrant to which the search area or the motion block belongs.

For example, in the case where the global motion type of the current frame 20 is ROTATE_CW, that is, if the search area (indicated by a black rectangle) or the motion block belongs to the first quadrant, the preferential area is designated as the lower right part of the search area. If the search area or the motion block belongs to the second quadrant, the preferential area is designated as the lower left part of the search area. If the search area or the motion block belongs to the third quadrant, the preferential area is designated as the upper left part of the search area. If the search area or the motion block belongs to the fourth quadrant, the preferential area is designated as the upper right part of the search area.

Further, in the case of the frame having the type ZOOM_IN, ZOOM_OUT, or ROTATE_CCW, the preferential area is designated as a different shape for each quadrant, as shown FIG. 11.

Figure 12:
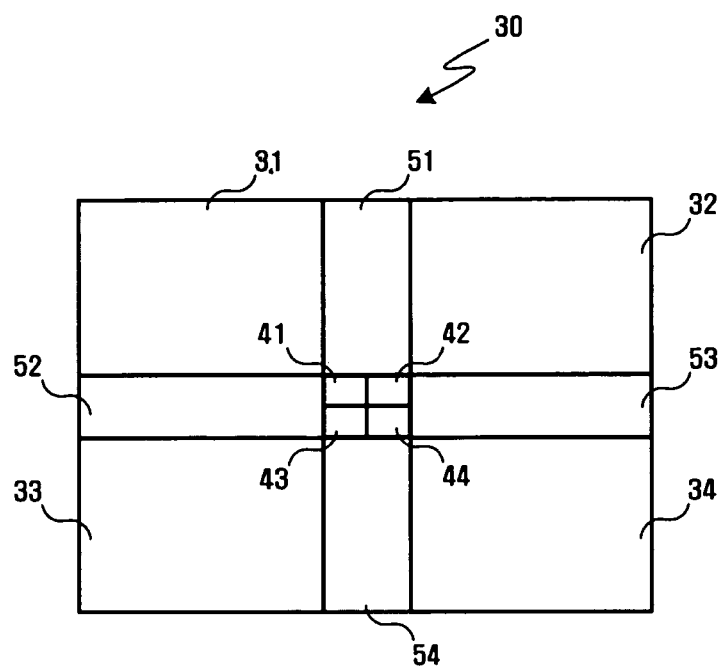
FIG. 12 is a view illustrating a frame classifying method according to another exemplary embodiment of the present invention.

In another exemplary embodiment of the present invention, it may be considered that the current frame is not divided into the four quadrants as shown in FIG. 11, but is divided in more detail. Referring to FIG. 12, a current frame 30 may be subdivided into 12 sections in total. That is, the current frame 30 may be subdivided into four corner sections 31, 32, 33, and 34, four border sections 51, 52, 53, and 54, and four center sections 41, 42, 43, and 44. However, the subdivision of the current frame is used to determine the preferential area in accordance with the global motion type previously determined. In the course of determining the global motion type of the current frame, it is sufficient to divide the current frame into the four quadrants as shown in FIG. 8.

If the global motion type is determined, the representative direction for each of the 12 border sections may be known in accordance with the interested global motion type, and the preferential area of the search area may be determined in accordance with the representative direction.

In the case of 8 types having a constant representative direction regardless of the areas of the frame among the global motion types, the above subdivision is not necessary. However, since the frame having the type ZOOM_IN, ZOOM_OUT, ROTATE_CW, or ROTATE_CCW has a different representative direction for each quadrant, it is necessary to determine the quadrant to which the search area or motion block belongs.

FIG. 13 is a view illustrating the representative vector for each section with respect to the four types: ZOOM_IN, ZOOM_OUT, ROTATE_CW, and ROTATE_CCW. It will be understood from FIG. 13 that four corner sections and four center sections have the same representative vector for each corresponding section.

Figure 14:
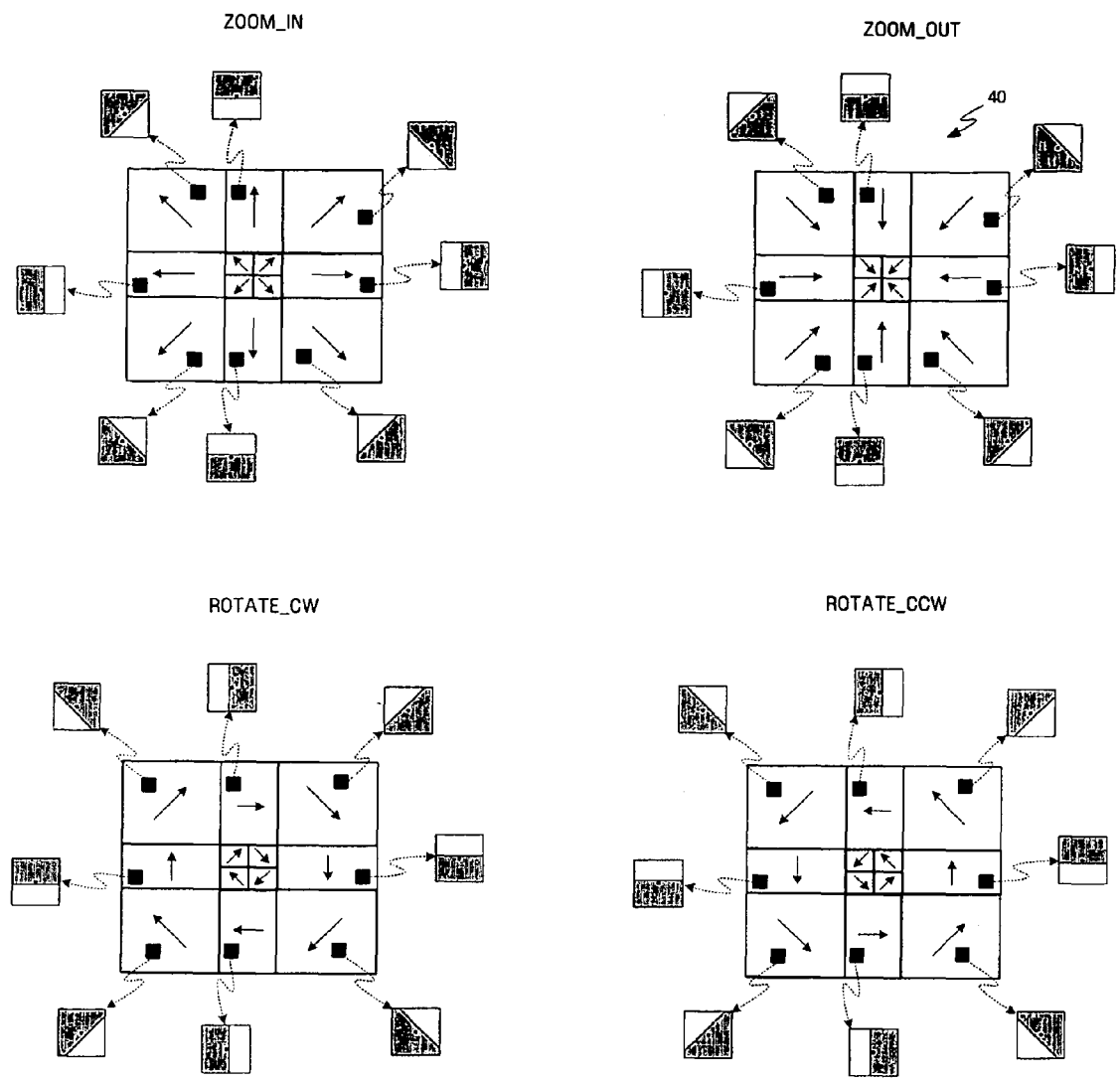
FIG. 14 is a view illustrating search areas for respective sections according to global motion type in FIG. 13.

FIG. 14 shows that the search areas may be indicated differently for each section. The four center sections have the same preferential areas as those of the four corresponding corner sections.

For example, in the case where the global motion type of the current frame 40 is ZOOM_OUT, i.e., if the search area (indicated by a black rectangle) or the motion block belongs to the first corner section (upper left corner section of the current frame), the preferential area is designated as the lower right part of the search area. If the search area or the motion block belongs to the second corner section (upper right corner section of the current frame), the preferential area is designated as the lower left part of the search area. If the search area or the motion block belongs to the third corner section (lower left corner section of the current frame), the preferential area is designated as the upper right upper of the search area. If the search area or the motion block belongs to the fourth corner section (lower left corner section of the current frame), the preferential area is designated as the upper left part of the search area.

Also, if the search area or the motion block belongs to the border section between the first corner section and the second corner section, the preferential area is designated as the lower part. If the search area or the motion block belongs to the border section between the second corner section and the fourth corner section, the preferential area is designated as the left part. If the search area or the motion block belongs to the border section between the third corner section and the fourth corner section, the preferential area is designated as the upper part. If the search area or the motion block belongs to the border section between the first corner section and the third corner section, the preferential area is designated as the right part.

If the remaining search area or motion block belongs to the center section, the preferential area is identical to the case of the corresponding corner section.

In the case where the global motion type of the previous frame is NO_GLOBAL_MOTION or the current frame is an original frame, since there is no basis for predicting the preferential area of the search area, the search-area-setting unit 111 allows the motion vector searching unit 112 to search for the motion vector with respect to the overall search area, as in the related art method.

Figure 15:
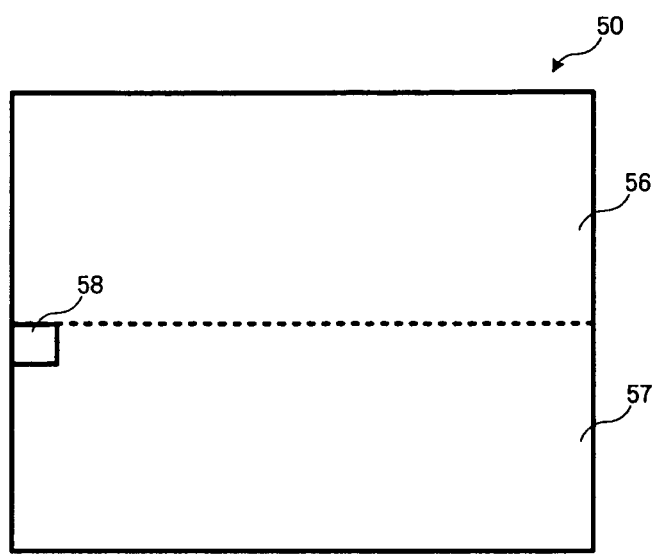
FIG. 15 is a view illustrating an example of setting a search area of the remaining parts by a representative direction of a part of a frame.

However, in the case where no global motion predicted from the previous frame exists, the present invention may be applied to a part of the current frame. Referring to FIG. 15, after the search for the motion vector has been completed with respect to the upper half 56 of the current frame 50, the search area for the motion block 58 belonging to the lower half 57 may be set depending upon the representative direction of the upper half 56.

The upper half 56 has two representative directions since it consists of two quadrants (first and second quadrants). Accordingly, the global motion type determined by four representative directions, is not set, but if two representative directions coincide, it will be assumed that the translation occurs in the same direction as the representative direction.

In the case where the representative directions coincide in two quadrants, the search-area-setting unit 111 may set the search area and the preferential area for the motion block 58 belonging to the lower half 56 through the same method as depicted in FIG. 10.

FIG. 15 shows only one exemplary embodiment, and it is possible to employ other methods of setting the search area of the motion block belonging to the remaining quadrants using the representative direction having a specified quadrant. For example, the search area of the motion block belonging to the remaining quadrants may be set in accordance with the representative direction of the first quadrant, and the search area of the motion block belonging to the second and fourth quadrants may be set in accordance with the representative directions of the first and third quadrants.

The search-area-setting unit 111 outputs the information on the search area and the preferential area determined by the algorithm to the motion vector searching unit 112. The information may be output for each motion block.

Referring to FIG. 1, the motion vector searching unit 112 searches for the motion vector within the search area that is set by the search-area-setting unit 111. If an additional preferential area is not designated in the provided search area, the motion vector searching unit 112 searches for the motion vector within the rectangular search area. According to the method of searching for the motion vector, the motion block moves within the search area of the reference frame to obtain the motion vector whereby the SAD between the motion block and the image of the corresponding reference frame is minimized, as described above. The SAD may be replaced by the mean of the absolute difference (MAD) or any value indicating a difference between the two images.

If the search area provided by the search-area-setting unit 111 is designated as an additional preferential area, the motion vector searching unit 112 preferentially searches for the motion vector within the preferential area. As a result, if any SAD that is smaller than a specified critical value is found within the preferential area, the vector is selected as the motion vector MV. If an SAD smaller than a specified critical value is not found within the preferential area, a motion vector is searched for in other areas within the search area until an SAD smaller than the critical value is found. If an SAD smaller than a specified critical value is found within other areas, the vector at the point where the SAD is minimized is selected as the motion vector MV.

The motion vector searching unit 112 provides the motion vector (obtained as above) to the motion compensation unit 120 and the motion-classifying unit 1113.

The motion-classifying unit 113 determines which direction class among a specified number of direction classes (md_class) the provided motion vector belongs to. The global motion judgment unit 114 judges the global motion type (gm_type) in accordance with the direction class, and stores the results of judgment in the buffer 1115. And, the global motion types stored in the buffer 115 are used to estimate the motion of the frame to be encoded.

The motion compensation unit 120 performs the motion compensation for a reference frame $F'_r$ using the motion vector MV provided by the motion estimation unit 110 to obtain a predicted frame P. If plural reference frames $F'_r$ exist, the motion compensation unit performs the motion compensation for the plural reference frames. Each weighted sum of the reference frames may be used as the predicted frame P.

In the reference frame symbol $F'_r$, r indicates the reference frame, and the prime symbol indicates the restored frame (i.e., the frame decoded after being encoded). The method using the restored frame as the reference frame is referred to as "closed-loop coding", and the method using the original frame is referred to as "open-loop coding". In the exemplary embodiments of the present invention, closed-loop coding is exemplified, but it will be apparent that the present invention can be applied to open-loop encoding as well.

The subtractor 125 subtracts the predicted frame P from the current frame F to obtain a residual signal R, and provides the obtained residual signal R to the transform unit 130.

The transform unit 130 performs the spatial transform of the residual signal R to generate transform coefficients $R^T$. The discrete cosine transform (DCT) or the wavelet transform may be used as the spatial transform method. In the case of using the DCT, the transform coefficients will be DCT coefficients, and in the case of using the wavelet transform, the transform coefficients will be wavelet coefficients.

The quantization unit 140 quantizes the transform coefficients. The quantization is the process of approximating the transform coefficients represented as real values by discrete values. For example, the quantization unit 140 performs the quantization by dividing the real-valued transform coefficients into specified quantization steps, and rounding off the results of the division to integer values. The quantization step may be variably determined by receiving feedback, and the video compression rate is varied depending on the size of the bitstream.

The quantization results from the quantization unit 140, i.e., the quantization coefficients $R^Q$, are provided to the entropy coding unit 150 and the inverse-quantization unit 160.

The inverse-quantization unit 160 inversely quantizes the quantized coefficients. The inverse-quantization process is the process of restoring the values that match the indices generated in the quantization process using the same quantization steps as those used in the quantization process.

The inverse transform unit 170 receives the inverse-quantization results and performs the inverse transform of the inverse-quantization results. The inverse transform is a process inverse to the transform process. Inverse DCT or inverse wavelet transform may be used as the inverse transform method.

The adder 175 adds the results of inverse transform to the predicted frame P output from the motion compensation unit 120 to generate the restored current frame F'.

The buffer 115 stores the results provided from the adder 175. Accordingly, the buffer 115 may store the previously restored reference frame $F'_r$, as well as the restored current frame F'.

The entropy coding unit 150 performs a lossless coding of the motion vectors MV motion-estimated by the motion estimation unit 105 and the compressed texture RQ provided from the quantization unit 140 to generate a bitstream. Huffman coding, arithmetic coding, variable length coding, and or other methods may be used as the lossless coding method.

The components that constitute the video encoder 100 of FIG. 2 may be embodied or performed by a general purpose processor designed to perform the functions described herein, a digital signal processor (DSP), an application specific integrated circuit (ASIC), a field programmable gate array (FPGA) or other programmable logic device, a discrete gate or transistor logic device, discrete hardware components, and their combinations. Alternatively, the components that constitute the video encoder 100 of FIG. 2 may be embodied or performed by a general purpose processor (conventional processor), a controller, a microcontroller, or a state machine. Further, the processor may be embodied by the combination of computing devices, for example, the combination of a DSP and the microprocessor, a number of microprocessors, at least one microprocessor associated with a DSP core, or other constructions.

Figure 16:
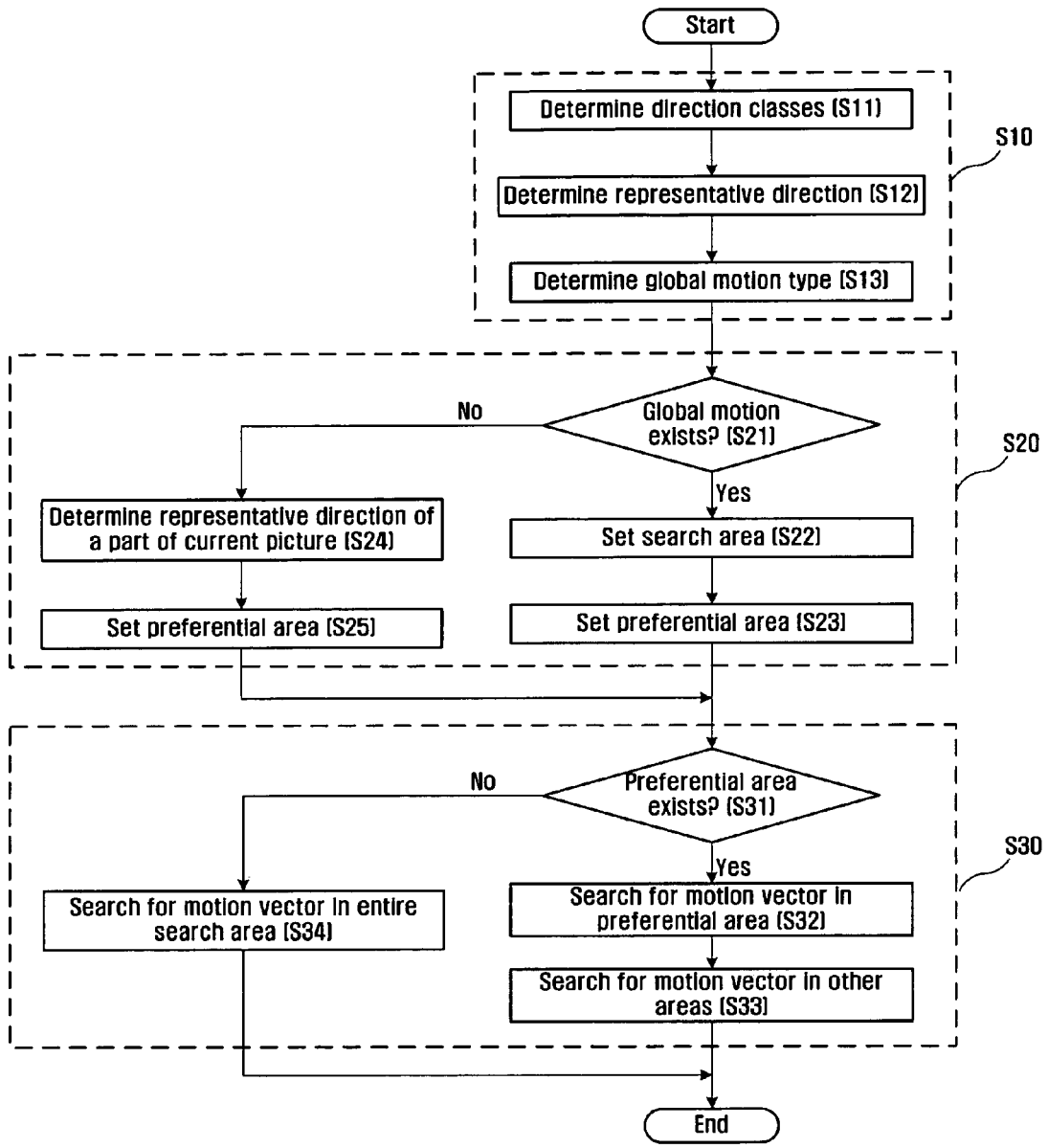
FIG. 16 is a flowchart illustrating a motion-estimation method according an exemplary embodiment of the present invention.

FIG. 16 is a flowchart showing a motion estimation method according to an exemplary embodiment of the present invention.

The motion estimation method comprises determining the global motion type of the previous frame from the motion vectors contained in the previous frame (S10), setting the search area for a specified motion block contained in the current frame based on the global motion type (S20), and searching for the motion vector within the set search area (S30).

Specifically, the motion-classifying unit 113 determines the direction classes to which the motion vectors of the previous frame belong (S11). The direction class comprises eight directions that divide 360 degrees into eight sections. The eight sections are divided by the four lines: y=kx, y=−kx, y=x/m, and y=−x/m. Here, k and m are positive, real numbers, and may take any value; that is, k and m may be the same or different. In the exemplary embodiment of the present invention, k and m are 2.

Then, the global motion judgment unit 114 determines the representative direction that represents the direction classes belonging to the specified area among the direction classes (S12). The specified area means any one of the areas obtained by dividing the previous frame into four sections.

The representative direction means the direction of the direction class having the highest frequency among the direction classes that belong to the specified area, or the direction of the direction class having the highest frequency, which is weighted by an area of the motion block.

The global motion judgment unit 114 judges the global motion type with reference to the representative direction (S13). The global motion types may include eight translational motion types, two rotational motion types, a zoom-in motion type, and a zoom-out motion type.

In operation S21, it is determined whether global motion exists in the previous frame. In the case where global motion exists in the previous frame (the global motion type is not NO_GLOBAL_MOTION), the search-area-setting unit 111 first sets the search area by user input or to a default value (S22).

Then, the preferential area for preferentially searching for the motion vector among the search areas is set based on the global motion type (S23).

In the case where the global motion does not exist in the previous frame, the search-area-setting unit 111 determines the representative direction of the area from the motion vector obtained through the full search of a part of the current frame (e.g., first and second quadrants) (S24). Accordingly, with respect to other areas among the current frame, the preferential area is determined with reference to the representative direction (S25).

In view of the global motion type, the preferential area is half of the search area where the error (SAD or MAD) is likely minimized, and may further comprise the search origin.

In operation S31, it is determined whether the preferential area exists in the current motion block. In the case where the preferential area exists in the current motion block, the motion vector searching unit 112 searches for the motion vector with respect to the preferential area (S32). If the motion vector is not found, the motion vector searching unit 112 searches for the motion vector in other areas. Whether the motion vector is found is determined depending upon whether the error calculated between the motion block and the reference image corresponding to the motion block is smaller than a specified critical value.

If the preferential area does not exist in the current motion block (NO in operation S31), the motion vector searching unit 112 searches the whole search area for the motion Vector (S34).

As described above, the exemplary embodiment of present invention preferentially searches about 50% of the area for the motion vector as compared to 100% in the related art full search, thereby significantly increasing the encoding speed of the video encoder.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A motion estimation method comprising:
   determining whether a global motion type of a previous frame based on motion vectors of the previous frame exists;
   if it is determined that the global motion type exists, setting a search area, and then setting a preferential area for preferentially searching for a motion vector for a motion block included in a current frame in the search area based on the global motion type;
   if it is determined that the global motion type does not exist, determining a representative direction of motion vectors obtained through full search of a partial area of the current frame, and determining a preferential area for another area among the current frame in accordance with the representative direction of the motion vectors obtained through full search of the partial area of the current frame;
   determining whether the preferential area exists in the motion block;
   if it is determined that the preferential area exists in the motion block, searching for the motion vector within the preferential area, and if the motion vector is not found in the preferential area, searching for the motion vector in another area in the search area; and
   if it is determined that the preferential area does no exist in the motion block, searching for the motion vector in an entire area of the search area.

2. The motion estimation method as claimed in claim 1, wherein the determining the global motion type of the previous frame comprises:

determining direction classes to which the motion vectors of the previous frame belong;
determining a representative direction that represents the direction classes belonging to a specified area among the direction classes; and
determining the global motion type based on the representative direction representing the direction classes.

3. The motion estimation method as claimed in claim 2, wherein the direction class is one of eight direction classes formed by dividing 360 degrees into eight sections.

4. The motion estimation method as claimed in claim 2, wherein the specified area is at least one of areas obtained by dividing the previous frame into four sections.

5. The motion estimation method as claimed in claim 2, wherein the representative direction representing the direction classes is a direction of a direction class having a highest-frequency among the direction classes belonging to the specified area.

6. The motion estimation method as claimed in claim 2, wherein the representative direction representing the direction classes is a direction of a direction class having a highest frequency, which is weighted by an area of the motion block, among the direction classes belonging to the specified area.

7. The motion estimation method as claimed in claim 1, wherein the global motion type is one of eight translational motion types, two rotational motion types, a zoom-in motion type, and a zoom-out motion type.

8. The motion estimation method as claimed in claim 1, wherein the motion block has a size of 16×16, 16×8, 8×16, 8×8, 8×4, 4×8, or 4×4.

9. The motion estimation method as claimed in claim 1, wherein one half of the preferential area likely minimizes an error.

10. The motion estimation method as claimed in claim 9, wherein the preferential area includes a search origin.

11. The motion estimation method as claimed in claim 9, wherein the error is a sum of absolute difference (SAD) or a mean of absolute difference (MAD) calculated between the motion block and an image of a reference frame corresponding to the motion block.

12. The motion estimation method as claimed in claim 1, wherein the partial area of the current frame is a first quadrant and a second quadrant.

13. The motion estimation method as claimed in claim 1, wherein whether the motion vector is searched for is determined depending on whether an error calculated between the motion block and an image of a reference image corresponding to the motion block is smaller than a critical value.

14. A motion estimation method comprising:
determining a global motion type of a previous frame based on motion vectors of the previous frame;
setting a search area, and then setting a preferential area for preferentially searching for a motion vector for a motion block included in a current frame in the search area based on the global motion type; and
searching for the motion vector within the preferential area, and if the motion vector is not found in the preferential area, searching for the motion vector in another area in the search area,
wherein the determining the global motion type of the previous frame comprises:
determining direction classes to which the motion vectors of the previous frame belong;
determining a representative direction that represents the direction classes belonging to a specified area among the direction classes; and
determining the global motion type based on the representative direction,
wherein the direction class is one of eight direction classes formed by dividing 360 degrees into eight sections, and
wherein the eight sections are created by four lines: y=kx, y=kx, y=x/m, and y=x/m, wherein k and m are positive, real numbers.

15. The motion estimation method as claimed in claim 14, wherein k and m are equal to 2.

16. A video encoding method comprising:
obtaining a motion vector of a current frame based on a reference frame;
performing motion compensation on the reference frame using the motion vector and generating a predicted frame; and
encoding a difference between the current frame and the predicted frame,
wherein the obtaining the motion vector comprises:
determining whether a global motion type of a previous frame based on motion vectors of the previous frame exists;
if it is determined that the global motion type exists, setting a search area, and then setting a preferential area for preferentially searching for a motion vector for a motion block included in the current frame in the search area based on the global motion type;
if it is determined that the global motion type does not exist, determining a representative direction of motion vectors obtained through full search of a partial area of the current frame, and determining a preferential area for another area among the current frame in accordance with the representative direction of the motion vectors obtained through full search of the partial area of the current frame;
determining whether the preferential area exists in the motion block;
if it is determined that the preferential area exists in the motion block, searching for the motion vector within the preferential area, and if the motion vector is not found in the preferential area, searching for the motion vector in another area in the search area; and
if it is determined that the preferential area does not exist in the motion block, searching for the motion vector in an entire area of the search area.

17. The video encoding method as claimed in claim 16, wherein the encoding the difference between the current frame and the predicted frame comprises:
spatially transforming the difference to generate transform coefficients;
quantizing the transform coefficients according to a quantization step to generate quantization coefficients; and
performing a lossless coding of the quantization coefficients.

18. The video encoding method as claimed in claim 16, wherein the determining the global motion type of the previous frame comprises:
determining direction classes to which the motion vectors of the previous frame belong;
determining a representative direction that represents the direction classes that belong to a specified area among the direction classes; and
determining the global motion type based on the representative direction.

19. The video encoding method as claimed in claim 16, wherein the global motion type is one of eight translational motion types, two rotational motion types, a zoom-in motion type, and a zoom-out motion type.

20. The video encoding method as claimed in claim 16, wherein the motion block has a size of 16×16, 16×8, 8×16, 8×8, 8×4, 4×8, or 4×4.

21. A video encoder comprising:
a motion estimation unit which obtains a motion vector of a current frame with reference to a reference frame;
a motion compensation unit which motion-compensates the reference frame using the motion vector obtained through the motion estimation and generating a predicted frame; and
an encoding unit which encodes a difference between the current frame and the predicted frame,
the motion estimation unit comprising:
a global motion judgment unit which determines a global motion type of a previous frame based on motion vectors of the previous frame;
a search area setting unit which sets a search area, and then sets a preferential area for preferentially searching for a motion vector for a motion block included in the current frame in the search area based on the global motion type if it is determined that the global motion type exists; and
a motion vector searching unit which searches for the motion vector,
wherein the search area setting unit determines a representative direction of motion vectors obtained through full search of a partial area of the current frame and determines a preferential area for another area among the current frame in accordance with the representative direction of the motion vectors obtained through full search of the partial area of the current frame if it is determined that the global motion type does not exist, and
wherein the motion vector searching unit searches for the motion vector within the preferential area if it is determined that the preferential area exists in the motion block, searches for the motion vector in another area in the search area if the motion vector is not found in the preferential area, and if it is determined that the preferential area does not exist in the motion block, searches for the motion vector in an entire area of the search area.

22. The video encoder as claimed in claim 21, wherein the motion estimation unit further comprises a motion classifying unit which determines determining direction classes to which the motion vectors of the previous frame belong, and
the global motion judgment unit determines a representative direction that represents the direction classes that belong to a specified area among the direction classes, and determines the global motion type based on the representative direction.

23. The video encoder as claimed in claim 21, wherein the global motion type is one of eight translational motion types, two rotational motion types, a zoom-in motion type, and a zoom-out motion type.

24. The video encoder as claimed in claim 21, wherein the motion block has a size of 16×16, 16×8, 8×16, 8×8, 8×4, 4×8, or 4×4.

25. The video encoder as claimed in claim 21, wherein the encoding unit comprises:
a transform unit which performs a spatial transform on the difference and generating transform coefficients;
a quantization unit which quantizes the transform coefficients according to a specified quantization step and generating quantization coefficients; and
an entropy coding unit which performs a lossless coding of the quantization coefficients.

26. A non-transitory recording medium recording a computer-readable program for executing a motion estimation method, the motion estimation method comprising:
determining whether a global motion type of a previous frame based on motion vectors of the previous frame exists;
if it is determined that the global motion type exists, setting a search area, and then setting a preferential area for preferentially searching for a motion vector for a motion block included in a current frame in the search area based on the global motion type;
if it is determined that the global motion type does not exist, determining a representative direction of motion vectors obtained through full search of a partial area of the current frame, and determining a preferential area for another area among the c ent frame in accordance with the representative direction of the motion vectors obtained through full search of the partial area of the current frame;
determining whether the preferential area exists in the motion block;
if it is determined that the preferential area exists in the motion block, searching for the motion vector within the preferential area, and if the motion vector is not found in the preferential area, searching for the motion vector in another area in the search area; and
if it is determined that the preferential area does not exist in the motion block, searching for the motion vector in an entire area of the search area.

* * * * *